(12) United States Patent
Ono et al.

(10) Patent No.: US 11,938,553 B2
(45) Date of Patent: Mar. 26, 2024

(54) HOLE FINISHING TOOL AND METHOD OF PRODUCING HOLE FINISHED PRODUCT

(71) Applicant: SUBARU CORPORATION, Tokyo (JP)

(72) Inventors: Ryohei Ono, Tokyo (JP); Masao Watanabe, Tokyo (JP); Tatsuo Nakahata, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/239,845

(22) Filed: Apr. 26, 2021

(65) Prior Publication Data
US 2021/0370422 A1     Dec. 2, 2021

(30) Foreign Application Priority Data

May 27, 2020     (JP) .................................. 2020-092747

(51) Int. Cl.
*B23D 77/00*     (2006.01)
*B23D 75/00*     (2006.01)

(52) U.S. Cl.
CPC ......... *B23D 77/006* (2013.01); *B23D 75/005* (2013.01); *B23D 2277/06* (2013.01); *B23D 2277/60* (2013.01); *B23D 2277/82* (2013.01)

(58) Field of Classification Search
CPC ............... B23D 75/005; B23D 77/006; B23D 2277/06; B23D 2277/60; B23D 2277/82
See application file for complete search history.

(56) References Cited

U.S. PATENT DOCUMENTS

| | | | |
|---|---|---|---|
| 1,962,241 | A | 6/1934 | Hawkinson |
| 3,054,308 | A | 9/1962 | Larry |
| 3,071,030 | A | 1/1963 | Larry |
| 3,120,766 | A | 2/1964 | Zager |
| 3,199,382 | A | 8/1965 | Andreasson |

(Continued)

FOREIGN PATENT DOCUMENTS

| | | | |
|---|---|---|---|
| CH | 449390 A | * | 12/1967 |
| CN | 103527097 A | | 1/2014 |

(Continued)

OTHER PUBLICATIONS

Translation of JP-2015136782-A, uploaded Oct. 26, 2022.*

(Continued)

*Primary Examiner* — Eric A. Gates
(74) *Attorney, Agent, or Firm* — Smith, Gambrell & Russell, LLP (57) ABSTRACT

According to one implementation, a hole finishing tool includes a reaming cutter and a holder. The reaming cutter has a first detaching structure. The first flow path for ejecting cutting oil is formed inside the reaming cutter. The holder has a second detaching structure. The second detaching structure is detached from and attached to the first detaching structure. The second flow path for supplying the cutting oil to the first flow path is formed inside the holder. The holder has a shank. The shank is held by a tool rotating device. The holder has a sliding portion. The sliding portion has no back taper. The sliding portion is inserted into a positioning bush and slid inside the positioning bush. The sliding portion has a concave portion for storing lubrication oil.

23 Claims, 5 Drawing Sheets

(56) References Cited

U.S. PATENT DOCUMENTS

| | | | |
|---|---|---|---|
| 3,216,107 A * | 11/1965 | Andreasson | B23D 77/006 408/59 |
| 3,320,832 A | 5/1967 | Jensen | |
| 3,543,613 A | 12/1970 | Obloy | |
| 3,767,315 A | 10/1973 | Burks | |
| 3,841,417 A | 10/1974 | Crawford, Jr. | |
| 4,643,621 A | 2/1987 | Fuller et al. | |
| 4,693,642 A | 9/1987 | Mair et al. | |
| 5,238,335 A * | 8/1993 | Nomura | B23D 77/02 408/199 |
| 5,312,209 A | 5/1994 | Lindblom | |
| 5,478,176 A | 12/1995 | Stedt et al. | |
| 5,540,526 A | 7/1996 | Hyatt et al. | |
| 5,704,739 A | 1/1998 | Bridenstine et al. | |
| 5,993,120 A | 11/1999 | Giessler | |
| 6,045,301 A | 4/2000 | Kammermeier et al. | |
| 6,210,083 B1 | 4/2001 | Kammermeier et al. | |
| 6,280,126 B1 | 8/2001 | Slocum et al. | |
| 6,524,034 B2 | 2/2003 | Eng et al. | |
| 7,556,458 B2 | 7/2009 | Heilmann et al. | |
| 7,938,048 B2 | 5/2011 | Nyström | |
| 8,876,442 B2 | 11/2014 | Saito et al. | |
| 8,944,732 B2 | 2/2015 | Osawa et al. | |
| 9,144,853 B2 | 9/2015 | Bitzer et al. | |
| 9,346,111 B2 * | 5/2016 | Behling | B23D 75/00 |
| 9,636,753 B2 | 7/2017 | Anson et al. | |
| 9,987,691 B2 | 6/2018 | Higashiwaki et al. | |
| 9,999,929 B2 * | 6/2018 | Rimet | B23B 31/1071 |
| 10,537,943 B2 | 1/2020 | Jager et al. | |
| 11,213,899 B2 | 1/2022 | Ono et al. | |
| 2001/0031182 A1 | 10/2001 | Widin | |
| 2007/0172323 A1 | 7/2007 | Radkowitsch et al. | |
| 2011/0027028 A1 | 2/2011 | Sadaoka et al. | |
| 2014/0348603 A1 | 11/2014 | Miyajima et al. | |
| 2015/0298222 A1 | 10/2015 | Ach et al. | |
| 2015/0328696 A1 | 11/2015 | Wang et al. | |
| 2015/0360302 A1 | 12/2015 | Guter | |
| 2016/0263666 A1 | 9/2016 | Myers et al. | |
| 2018/0133809 A1 | 5/2018 | Brunner | |
| 2019/0030623 A1 * | 1/2019 | Ono | B23B 49/023 |
| 2020/0180045 A1 | 6/2020 | Ono et al. | |
| 2020/0261990 A1 | 8/2020 | Ono et al. | |

FOREIGN PATENT DOCUMENTS

| | | | |
|---|---|---|---|
| CN | 104227092 A | 12/2014 | |
| CN | 105 478 866 A | 4/2016 | |
| CN | 205551566 U | 9/2016 | |
| CN | 106475607 A | 3/2017 | |
| DE | 90 16 440 U1 | 4/1991 | |
| DE | 10 2010 002 669 A1 | 9/2011 | |
| DE | 102013205026 A1 | 9/2014 | |
| DE | 102018202383 A1 * | 8/2019 | |
| EP | 2 266 733 A1 | 12/2010 | |
| EP | 2 719 489 A1 | 4/2014 | |
| EP | 2 979 795 A1 | 2/2016 | |
| EP | 3 434 402 A1 | 1/2019 | |
| EP | 3 666 434 A1 | 6/2020 | |
| JP | S43-029791 | 12/1965 | |
| JP | S47-034528 U | 12/1972 | |
| JP | S60-143606 U | 9/1985 | |
| JP | H05-012023 U | 2/1993 | |
| JP | H07-43367 U | 8/1995 | |
| JP | 1997-085533 A | 3/1997 | |
| JP | H11-138319 A | 5/1999 | |
| JP | 2003-275915 A | 9/2003 | |
| JP | 2004-130412 A | 4/2004 | |
| JP | 2005-288679 A | 10/2005 | |
| JP | 2006-102868 A | 4/2006 | |
| JP | 2009-083092 A | 4/2009 | |
| JP | 2009-184056 A | 8/2009 | |
| JP | 2009-233780 A | 10/2009 | |
| JP | 2009-255229 A | 11/2009 | |
| JP | 2010-089175 A | 4/2010 | |
| JP | 2010-284752 A | 12/2010 | |
| JP | 2015-120216 A | 7/2015 | |
| JP | 2015136782 A * | 7/2015 | |
| JP | 2019-025573 A | 2/2019 | |
| PL | 199163 B1 * | 8/2008 | |
| WO | WO-2007093169 A2 * | 8/2007 | B23B 31/266 |

OTHER PUBLICATIONS

Translation of PL-199163-B1, uploaded Oct. 26, 2022.*
Final Office Action dated Jan. 7, 2022 in U.S. Appl. No. 16/74,714 (14 pages).
Non Final Office Action dated Jan. 27, 2021 in U.S. Appl. No. 16/671,420 (16 pages).
Extended European Search Report dated Jul. 3, 2020 in Patent Application No. 20150068.3 (15 pages).
Extended European Search Report dated May 15, 2020 in Patent Application No. 19207608.1 (11 pages).
Second Japanese Office Action dated Nov. 6, 2019 in JP 2017-146120 (10 pages with English Translation).
Japanese Office Action dated Jun. 4, 2019 in JP2017-146120 (10 pages with English Translation).
Extended European Search Report dated Dec. 19, 2018 in EP 18179484.3.
Office Action dated Dec. 11, 2020 in U.S. Appl. No. 15/992,682 (13 pages).
Office Action dated Jul. 1, 2022 in Japanese Patent Application No. 2019-024424 (4 pages in Japanese with English translation). [Family member of U.S. Appl. No. 16/740,714.]
Office Action dated Jul. 1, 2022 in Japanese Patent Application No. 2018-231034 (3 pages in Japanese with English translation). [Family member of U.S. Appl. No. 16/671,420, which has been issued as U.S. Pat. No. 11,370,038.]
Non Final Office Action dated Apr. 27, 2022 in U.S. Appl. No. 16/740,714 (7 pages).
Notice of Allowance dated Nov. 10, 2021 in U.S. Appl. No. 16/671,420 (9 pages).
Notice of Allowance dated Aug. 30, 2021 in U.S. Appl. No. 15/992,682 (8 pages).
Final Office Action dated Apr. 16, 2021 in U.S. Appl. No. 15/992,682. (6 pages).
Non-Final Office Action dated Jun. 4, 2020 in U.S. Appl. No. 15/992,682 (12 pages).
Final Office Action dated Nov. 26, 2019 in U.S. Appl. No. 15/992,682 (12 pages).
Non Final Office Action dated Apr. 15, 2019 U.S. Appl. No. 15/992,682 (12 pages).
Office Action dated Jul. 28, 2022 in Chinese Patent Application No. 201810778880 (7 pages in Chinese with English translation). [Family member of U.S. Appl. No. 15/992,682, which has been issued to Applicant as U.S. Pat. No. 11,213,899.]
Office Action dated May 11, 2022 in European Patent Application No. 18179484.3 (14 pages).
Taiwanese First Office Action dated Sep. 17, 2021 in Taiwanese Patent Application No. 107123200 (7 Pages in Chinese with English translation).
Advisory Action dated Oct. 6, 2021 in U.S. Appl. No. 16/671,420 (5 pages).
Office Action dated in U.S. Appl. No. 16/740,714 (11 pages).
Office Action dated Jul. 28, 2021 in U.S. Appl. No. 16/671,420 (14 pages).
Office Action dated Jun. 14, 2022 in Korean Patent Application No. 20180041476 (5 pages in Korean with English translation). [Family member of U.S. Appl. No. 15/992,682, which has been issued as U.S. Pat. No. 11,213,899.].
European Extended Search Report dated Oct. 19, 2021 in European Patent Application No. 21170370.7 (10 pages).
Office Action dated Dec. 13, 2022 in Japanese Patent Application No. 2019-024424 (6 pages in Japanaese with English translation). [Family member of U.S. Appl. No. 16/740,714, which has been issued to Applicant as U.S. Pat. No. 11,524,346.]

(56) References Cited

OTHER PUBLICATIONS

Office Action dated Oct. 6, 2023 in European Patent Application No. 19207608.1 (5 pages). [Family member of U.S. Appl. No. 16/671,420, now U.S. Pat. No. 11,370,038.]
First Office Action dated Nov. 24, 2023 in Korean Patent Application No. 10-2019-0118212 (5 pages in Korean language; 5 pages English translation). [Family member of U.S. Appl. No. 16/671,420, now U.S. Pat. No. 11,370,038.]
Communication pursuant to Article 94(3) EPC dated Nov. 24, 2023 in European Patent Application No. 20150068.3 (6 pages). [Family member of U.S. Appl. No. 16/740,714, now U.S. Pat. No. 11,524,346.]
Office Action dated Dec. 28, 2023 for Japanese Patent Application No. 2020-0927247 (3 pages in Japanese; 5 pages English translation).
First Office Action dated Jan. 22, 2024 for Korean Patent Application No. 10-2019-0174129 (4 pages in Korean; 5 pages English machine translation). [Family member of U.S. Appl. No. 16/740,714, now U.S. Pat. No. 11,524,346.]

* cited by examiner

HOLE FINISHING TOOL AND METHOD OF PRODUCING HOLE FINISHED PRODUCT

CROSS REFERENCES TO RELATED APPLICATIONS

This application is based upon and claims the benefit of priority from Japanese Patent Application No. 2020-092747, filed on May 27, 2020; the entire contents of which are incorporated herein by reference.

FIELD

Implementations described herein relate generally to a hole finishing tool and a method of producing a hole finished product.

BACKGROUND

Conventionally, a reamer is known as a tool for finishing a hole (for example, refer to Japanese Patent Application Publication JP1997-085533A). In particular, in case of reaming titanium and/or fiber reinforced plastic (FRP) called composite material, such as glass fiber reinforced plastic (GFRP) or a carbon fiber reinforced plastic (CFRP), whose mechanical strengths are large, a reamer is made of cemented carbide since high rigidity for securing processing accuracy and high cutting performance are required.

Nevertheless, it is desired to reduce usage of expensive cemented carbide. As a tool which can reduce usage of cemented carbide, a tool composed of a holder and exchange-type cutting edges detachably coupled to the holder is known (for example, refer to Japanese Patent Application Publication JP2010-284752A). Exchange-type cutting edges allow the holder to be made of high-speed steel or the like more inexpensive than cemented carbide. In addition, exchange-type cutting edges also allow the holder to be continuously used by exchanging the worn edges also when the holder is made of cemented carbide in order to improve rigidity. Therefore, exchange-type cutting edges made of cemented carbide allow reduction in usage of the cemented carbide, compared with that of a tool, made of cemented carbide, whose cutting edges are not exchangeable.

However, when a hole is finished by a reamer whose cutting edges are exchangeable, attached to a handheld tool rotating device of which rigidity is extremely low compared with that of a machine tool, the finishing accuracy of the hole may be deteriorated due to the insufficient rigidity.

On the other hand, as a technique for processing a high precision hole even when rigidity comparable to that of a machine tool cannot be secured, a method of processing a hole by a drill held by a handheld tool rotating device, in the state where the drill has been positioned by a positioning bush, while sliding the drill by discharging lubrication oil from the inside of the drill to the clearance formed between the drill and the positioning bush has been proposed (for example, refer to Japanese Patent Application Publication JP2019-025573A). Moreover, a technique for supplying cutting fluid not from the inside of a drill but from the outside into the inside of a positioning bush has also been proposed (for example, refer to Japanese Patent Application Publication JP2006-102868A).

However, the conventional technique in which a tool is guided by a positioning bush requires to continuously supply lubrication oil between the tool and the positioning bush in order to process a high precision hole because of friction and thermal expansion of the tool. For that purpose, discharging lubrication oil from the inside of the tool results in scattering of the lubrication oil before a discharge port is inserted into the inside of the positioning bush. Accordingly, parts and structure for preventing the lubrication oil from scattering are required. Meanwhile, supplying the lubrication oil not from the inside of the tool but from the outside of the tool into the inside of the positioning bush requires a newly supply path dedicated for the lubrication oil.

Accordingly, an objection of the present invention is to make it possible to finish a hole with high precision by simple structure regardless of rigidity of a spindle while reducing the used amount of expensive material, such as cemented carbide.

SUMMARY OF THE INVENTION

In general, according to one implementation, a hole finishing tool includes a reaming cutter and a holder. The reaming cutter has a first detaching structure in a back end side of the hole finishing tool. The first flow path for ejecting cutting oil is formed inside the reaming cutter. The holder has a second detaching structure in a tip side of the hole finishing tool. The second detaching structure is detached from and attached to the first detaching structure. The second flow path for supplying the cutting oil to the first flow path is formed inside the holder. The holder has a shank in the back end side of the hole finishing tool. The shank is held by a tool rotating device. The holder has a sliding portion in the tip side of the hole finishing tool. The sliding portion has no back taper. The sliding portion is inserted into a positioning bush and slid inside the positioning bush. The sliding portion has a concave portion for storing lubrication oil.

Further, according to one implementation, a hole finishing tool includes a reaming cutter, a holder and a positioning bush. The reaming cutter has a first detaching structure in a back end side of the hole finishing tool. The first flow path for ejecting cutting oil is formed inside the reaming cutter. The holder has a second detaching structure in a tip side of the hole finishing tool. The second detaching structure is detached from and attached to the first detaching structure. The second flow path for supplying the cutting oil to the first flow path is formed inside the holder. The holder has a shank in the back end side of the hole finishing tool. The shank is held by a tool rotating device. The holder has a sliding portion in the tip side of the hole finishing tool. The sliding portion has no back taper. The positioning bush is for inserting and sliding the sliding portion. At least one of an outer surface of the sliding portion and an inner surface of the positioning bush has a concave portion for storing lubrication oil.

Further, according to one implementation, a method of producing a hole finished product includes producing the hole finished product using the above-mentioned hole finishing tool.

DETAILED DESCRIPTION

A hole finishing tool and a method of producing a hole finished product according to implementations of the present invention will be described with reference to the accompanying drawings.
(First Implementation)
(Structure and Function)

Figure 1:
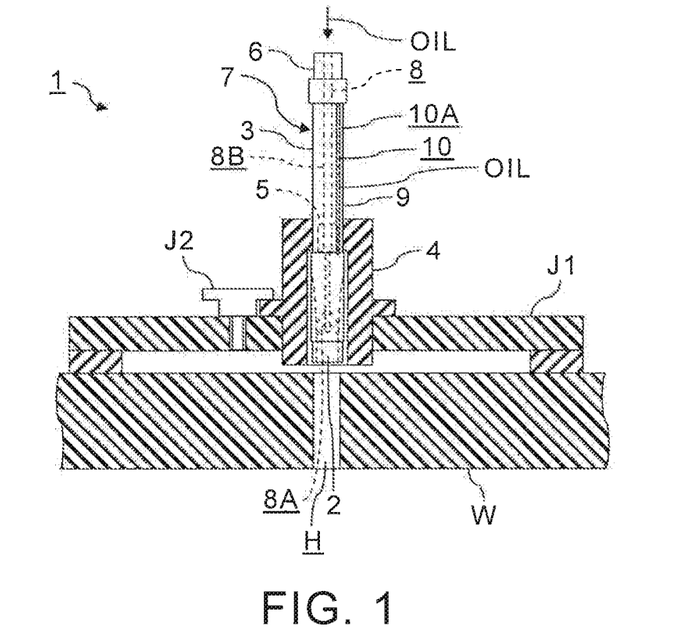
FIG. 1 schematic structure of a hole finishing tool according to the fist implementation of the present invention.

FIG. 1 shows schematic structure of a hole finishing tool according to the fist implementation of the present invention.

A hole finishing tool 1 is a tool for finishing processing of a prepared hole H which has been previously processed on a workpiece W by a drilling tool, such as a drill, i.e., a tool for reaming the prepared hole H. The hole finishing tool 1 can be composed of a reaming cutter 2, a holder 3, and a guide bush 4. Note that, a general-purpose bush may be used as the guide bush 4 while the hole finishing tool 1 may be composed of only the reaming cutter 2 and the holder 3.

Figure 2:
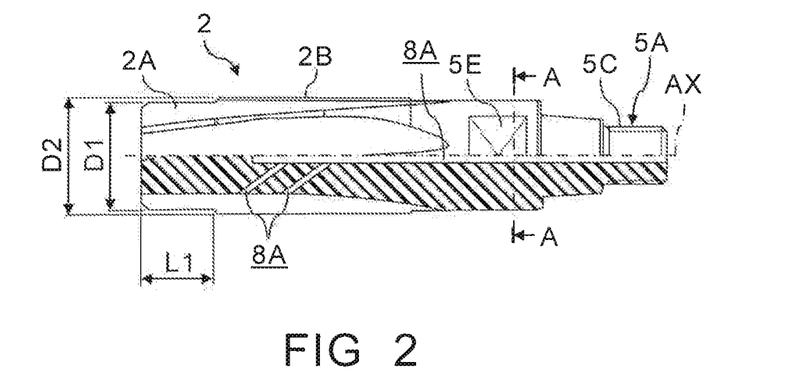
FIG. 2 is a partial longitudinal sectional view showing an example of detailed structure of the reaming cutter shown in FIG. 1.
Figure 3:
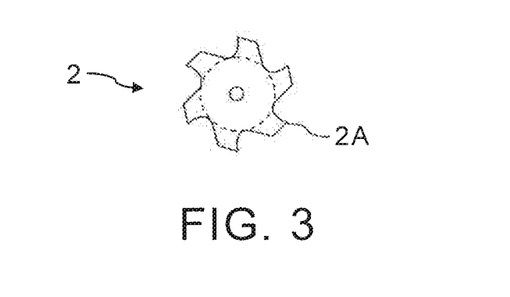
FIG. 3 is a left side view of the reaming cutter shown in FIG. 2.
Figure 4:
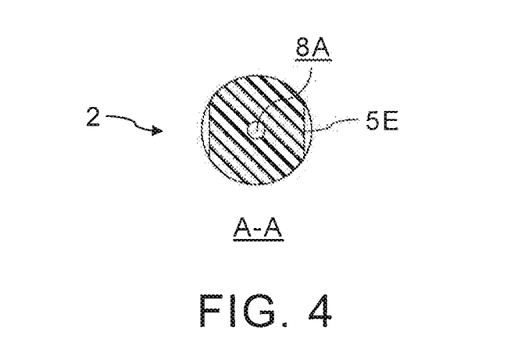
FIG. 4 is a cross sectional view of the reaming cutter at the position A-A shown in FIG. 2.
Figure 5:
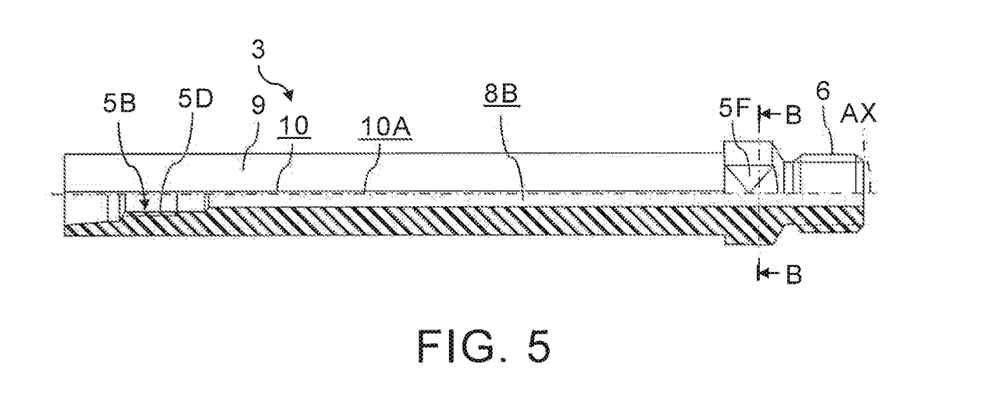
FIG. 5 is a partial longitudinal sectional view showing an example of detailed structure of the holder shown in FIG. 1.
Figure 6:
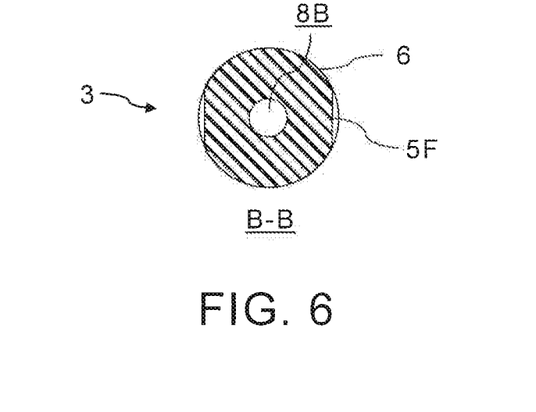
FIG. 6 is a cross sectional view of the holder at the position B-B shown in FIG. 5.

FIG. 2 is a partial longitudinal sectional view showing an example of detailed structure of the reaming cutter 2 shown in FIG. 1, FIG. 3 is a left side view of the reaming cutter 2 shown in FIG. 2, FIG. 4 is a cross sectional view of the reaming cutter 2 at the position A-A shown in FIG. 2, FIG. 5 is a partial longitudinal sectional view showing an example of detailed structure of the holder 3 shown in FIG. 1, and FIG. 6 is a cross sectional view of the holder 3 at the position B-B shown in FIG. 5.

The reaming cutter 2 has the first detaching structure 5A in the tool back end side. Meanwhile, the holder 3 has the second detaching structure 5B, which can be attached to and detached from the first detaching structure 5A, in the tool tip side while the holder 3 in the tool back end side forms a shank 6 for being held by a tool rotating device, having a motor and a holder rotated by the motor. Therefore, the reaming cutter 2 can be attached to and detached from the holder 3 by a detaching structure 5 composed of the first detaching structure 5A and the second detaching structure 5B, and a reamer 7 having replaceable cutting edges is composed by attaching the reaming cutter 2 to the holder 3.

For example, the detaching structure 5 can be composed of a combination of a male screw 5C and a female screw 5D as shown in FIG. 2 and FIG. 5, or a coupler composed of a male coupler and a female coupler. When the detaching structure 5 is composed of fasteners rotated around an axis, such as the male screw 5C and the female screw 5D, flat surfaces 5E can be formed on the reaming cutter 2 so that the reaming cutter 2 can be rotated by a wrench while flat surfaces 5F can be formed on the holder 3 so that the holder 3 can be fixed by a tool rest or a clamp.

The reamer 7 is a hole processing tool for finishing processing which extends the diameter of the prepared hole H processed by a drilling tool, such as a drill. Accordingly, the reamer 7 performs cutting by cutting edges formed not on the tip of the tool but on the lateral face of the tool while a drill performs cutting by cutting edges formed at the tip of the tool. Therefore, each cutting edge of the reaming cutter 2 extends in the length direction of the tool. Moreover, the reaming cutter 2 of the reamer 7 is characterized in that plastic forming is performed by pushing chips out to the advancing direction of the reamer 7 while a drill is characterized in that plastic forming is performed by ripping chips out in the opposite direction to the advancing direction of the drill.

Although the number of the cutting edges formed in the reaming cutter 2 is flexible, not less than two cutting edges lead to reduction in the deflection amount of the reamer 7. In the example shown in FIG. 3, six cutting edges are formed in the reaming cutter 2.

In addition, stepping the reaming cutter 2 so as to have diameters different from each other leads to further reduction in the deflection amount of the reamer 7 and further improvement in the processing accuracy of a finished hole. That is, it is desirable to make the diameter of the cutting edges in the tip side of the tool smaller than the diameter of the cutting edges in the back end side of the tool. Although the reaming cutter 2 may have not less than three different diameters so that the diameter may gradually become larger from the tip side of the tool toward the back end side of the tool, the effects of the reduction in the deflection amount of the reamer 7 and the improvement in the processing accuracy of a finished hole can be sufficiently achieved as long as the reaming cutter 2 is stepped to have double diameters consisting of the first diameter D1 in the tip side of the tool and the second diameter D2 in the back end side of the tool, as exemplified in FIG. 2.

When each cutting edge of the reaming cutter 2 is stepped, final finishing can be performed by the cutting edges in the back end side of the tool while guiding the cutting edges in the tip side of the tool by the prepared hole H, after semi-finishing, of which diameter has been expanded by the cutting edges in the tip side of the tool. As a concrete example, when the reaming cutter 2 has the first diameter D1 and the second diameter D2 as exemplified in FIG. 2, the first cutting edges 2A having the first diameter D1 can be guided by the prepared hole H whose diameter has been expanded to be larger than the first diameter D1 by semi-finishing machining using the first cutting edges 2A having the first diameter D1 while final finishing machining of the prepared hole H can be performed by the following second cutting edges 2B having the second diameter D2.

Accordingly, the cutting depth to the workpiece W in the final finishing machining by the second cutting edges 2B having the second diameter D2 decreases compared with that in machining by reamer edges which have not been stepped as well as the first cutting edges 2A having the first diameter D1 is guided by the prepared hole H after semi-finishing machining. Thereby, the deflection amount of the reaming cutter 2 in the tip side is also reduced. As a result, processing accuracy of a finished hole can be improved. In other words, the prepared hole H having a deeper depth can be finished. Moreover, the prepared hole H formed in the workpiece W made of titanium and/or FRP whose cutting resistance is large can be also finished with high accuracy.

When the first cutting edges 2A in the tip side of the tool should have a function to stop deflection, it is appropriate that the first cutting edges 2A are not chamfered edges themselves or rounded edges themselves but have a necessary length L1 in the tool axis AX direction with keeping the first diameter D1. As a result of tests, it has been confirmed that it is appropriate to make the length L1 of the first cutting edges 2A in the tool axis AX direction not less than 0.5 times and not more than 1 time the second diameter D2 of the second cutting edges 2B, which is the tool diameter of the reaming cutter 2, i.e, $0.5D2 \leq L1 \leq D2$, from a viewpoint of making the first cutting edges 2A have the function to stop deflection.

Note that, each of the first cutting edges 2A and the second cutting edges 2B may be chamfered in the tool tip side, as exemplified in FIG. 2. Moreover, each of the first cutting edges 2A and the second cutting edges 2B may have an appropriate back taper. When a back taper is formed, the variation in the cutting depth to the workpiece W can be decreased even when the reaming cutter 2 thermally expands due to cutting heat.

The reamer 7 assembled by attaching the above-mentioned reaming cutter 2 to the holder 3 has at least one flow path 8 of cutting oil inside. More specifically, the reaming cutter 2 internally has the first flow path 8A or the first flow paths 8A for ejecting the cutting oil toward the prepared hole H of the workpiece W. Meanwhile, the holder 3 internally has the second flow path 8B or the second flow paths 8B for supplying the cutting oil to the first flow path 8A or the first flow paths 8A.

Since the reaming cutter 2 is attached to the tool tip side of the holder 3, the second flow path 8B extends from the shank 6 side of the holder 3 toward the tool tip side. Accordingly, forming the single second flow path 8B consisting of a through hole centering the tool axis AX and the central axis of the holder 3 leads to simplification of manufacturing. In this case, the holder 3 has cylindrical structure. Meanwhile, the first flow paths 8A may be formed by branched flow paths for ejecting cutting oil in oblique directions, from outlets opening in grooves between lands, from the vicinity of the tool axis AX toward the inner surface of the prepared hole H since cutting target by the reaming cutter 2 is the inner surface of the prepared hole H.

The flow paths 8 of the cutting oil are formed by coupling the first flow paths 8A in the reaming cutter 2 to the second flow path 8B in the holder 3 so that the inlet port may open in the shank 6 side of the holder 3 while the outlet ports may open between lands which form the reaming cutter 2. Thereby, cutting oil supplied from a holder of a tool rotating device can be made to flow into the inlet port of the second flow path 8B, formed in the shank 6 side of the holder 3 while the cutting oil can be ejected from the outlet ports of the first flow paths 8A, formed between the cutting edges of the reaming cutter 2, toward the inner surface of the prepared hole H of the workpiece W.

The holder 3 has a sliding portion 9, having no back taper, in the tool tip side. The sliding portion 9 is used to be inserted into and slid inside the guide bush 4. Therefore, the length of the sliding portion 9 is determined as one covering a distance by which the holder 3 is slid inside the guide bush 4. The distance by which the holder 3 is slid is a distance by which the reaming cutter 2 is reciprocated, in the tool axis AX direction, relatively to the workpiece W. Therefore, the length of the sliding portion 9 is determined as a distance, longer than the depth of the prepared hole H, which defines a stroke of the reamer 7 in the tool axis AX direction.

The guide bush 4 is a positioning bush inserted into a positioning hole formed in a drilling jig J1, such as a drilling plate, placed on the workpiece W. The guide bush 4 has such cylindrical structure having a convex part on the outer surface that a stepped face normal to the central axis of the guide bush 4 may be formed, and the shape of the guide bush 4 is determined so that the fitting tolerance between the outer diameter of one end part of the guide bush 4 and the positioning hole formed in the drilling jig J1 may be tolerance corresponding to clearance fit. Therefore, when the end part of the guide bush 4 is inserted into the positioning hole formed in the drilling jig J1, the stepped face of the guide bush 4 contacts with the surface of the drilling jig J1, and thereby the guide bush 4 can be positioned to the drilling jig J1 in the radial direction and the length direction of the guide bush 4.

When the maximum diameter of the reaming cutter 2 is made larger than the diameter of the sliding portion 9 as illustrated, a hole whose depth is deeper than the length of the reaming cutter 2 can be finished since the sliding portion 9 of the holder 3 does not interfere with the hole finished by the reaming cutter 2. In this case, the through hole formed along the center of the guide bush 4 is formed as a stepped hole corresponding to the maximum diameter of the reaming cutter 2 and the diameter of the sliding portion 9. Specifically, the hole in the reaming cutter 2 side of the guide bush 4 is a hole which does not contact with the reaming cutter 2 while the hole in the holder 3 side of the guide bush 4 is a hole which slidably fits with the sliding portion 9 with the fitting tolerance corresponding to clearance fit.

Moreover, the reaming cutters 2 having the maximum diameters different from each other may be interchangeably attached to and detached from the holder 3. In that case, it is necessary to form the through hole, formed at the center of the guide bush 4, as a stepped hole so that interference with all the reaming cutters 2 can be avoided, as long as the maximum diameter of at least one of the reaming cutters 2 is larger than the diameter of the sliding portion 9 even when the maximum diameter of another one of the reaming cutters 2 is smaller than the diameter of the sliding portion 9.

When the maximum diameter of the reaming cutter 2 is larger than the diameter of the sliding portion 9, it is also necessary to insert the sliding portion 9 of the holder 3 into the guide bush 4 before the reaming cutter 2 is attached to the holder 3, except for a case where the shank 6 is a straight shank or the maximum diameter of the shank 6 is not more than the diameter of the sliding portion 9. Specifically, after the sliding portion 9 of the holder 3 has been inserted into the guide bush 4, the reaming cutter 2 has to be attached to the holder 3 by the detaching structure 5, such as screws or couplers, and subsequently the guide bush 4 has to be inserted into the positioning hole of the drilling jig J1.

The drilling jig J1 is previously set to the workpiece W so that the central axis of the positioning hole for inserting the guide bush 4 and the central axis of a hole after finishing machining may be on the same straight line. When a positional error between the central axis of the hole after finishing machining and the central axis of the prepared hole H is negligible, for example, the drilling jig J1 can be positioned to the workpiece W by inserting a stepped pin into both the positioning hole of the drilling jig J1 and the prepared hole H. As a matter of course, the drilling jig J1 may be positioned to the workpiece W by utilizing other reference holes formed in the workpiece W.

When the guide bush 4 is inserted into the positioning hole of the drilling jig J1 positioned to the workpiece W, the central axis of the through hole formed in the guide bush 4 and the central axis of the hole after finishing machining also lie on the same straight line. Therefore, when the sliding portion 9 of the holder 3 is inserted into and slid inside the guide bush 4, the reamer 7 composed of the reaming cutter 2 and the holder 3 can be moved forward and backward in the tool axis AX direction while positioning the tool axis AX of the reamer 7 on the same straight line as the central axis of the hole after finishing machining. As a result, it becomes possible to feed out the reamer 7 in an appropriate direction even when the reamer 7 has been held by a handheld tool rotating device which does not have a positioning function unlike a machine tool or the like.

Since the reamer 7 rotates around the tool axis AX, the convex portion of the guide bush 4 must be fixed to the drilling jig J1 by a setscrew J2. Therefore, although the holder 3 of the reamer 7 is slid inside the guide bush 4 in both the rotation direction and the tool axis AX direction, the deflection of the holder 3 and the reaming cutter 2 can be reduced, and thereby the accuracy of finishing of the hole can be improved since the sliding portion 9 of the holder 3 has no back taper.

Nevertheless, even if the sliding portion 9, having no back taper, of the holder 3 is tried to be slid inside the guide bush 4, the sliding portion 9 of the holder 3 cannot be slid as it is due to thermal expansion caused by excessive frictional heat. For that reason, at least one concave portion 10 is formed on the surface of the sliding portion 9. The concave portion 10 of the sliding portion 9 is used to store lubrication oil for reducing friction between the guide bush 4 and the sliding portion 9 as a main purpose.

That is, the holder 3 is fed out inside the guide bush 4 in a state where lubrication oil has been stored in the concave portion 10 of the sliding portion 9. Thereby, it becomes possible to reduce friction between the guide bush 4 and the sliding portion 9, and to slide the holder 3 inside the guide bush 4 even when the sliding portion 9 has no back taper. Note that, the lubrication oil can be stored in the concave portion 10 of the sliding portion 9 only by applying the lubrication oil on the concave portion 10 since the lubrication oil adheres on the surface of the concave portion 10 by surface tension.

In addition, when the concave portion 10 is formed on the surface of the sliding portion 9, chips generated by reaming the prepared hole H and possibly scattered inside the guide bush 4 can be released into the concave portion 10. Thereby, it becomes possible to avoid trouble that the reamer 7 cannot be fed out due to clogging by chips between the sliding portion 9 of the holder 3 and the guide bush 4.

In particular, cutting amount in reaming is smaller than that in drilling, and therefore the size of chips by reaming becomes fine. When material of the workpiece W is CFRP, powdered chips are generated. When chips become fine, the chips may enter into even the slight clearance, corresponding to the tolerance for clearance fit, between the guide bush 4 and the sliding portion 9. If an excess amount of the chips enters into the gap between the guide bush 4 and the sliding portion 9, it may become difficult to slide the holder 3 inside the guide bush 4 due to clogging by the chips. Therefore, it is desirable for stable reaming to take appropriate measures so that the clearance between the guide bush 4 and the sliding portion 9 may not be clogged by fine chips.

For that reason, the at least one concave portion 10 can be formed on the surface of the sliding portion 9 not only for storing lubrication oil in order to reduce the friction between the guide bush 4 and the sliding portion 9, but also as a relief for storing fine chips possibly generated by reaming. In other words, the at least one concave portion 10 can be formed on the surface of the sliding portion 9 so that the sliding portion 9 of the holder 3 can be slid inside the guide bush 4 even when any of thermal expansion of the holder 3 due to frictional heat and an entry of chips between the guide bush 4 and the holder 3 may arise.

In order to keep the lubricity between the guide bush 4 and the sliding portion 9, it is important to supply lubrication oil evenly from the at least one concave portion 10 of the sliding portion 9 out to the clearance between the guide bush 4 and the sliding portion 9. Meanwhile, in order to release chips between the guide bush 4 and the sliding portion 9 more certainly, it is important to form the at least one concave portion 10 so that the surface density of the at least one concave portion 10 lying between the guide bush 4 and the sliding portion 9 may always become appropriate even when the sliding portion 9 is slid.

For that purpose, what is necessary is to determine the position and the shape of the at least one concave portion 10 so that the at least one concave portions 10 may lie at every position, in the length direction of the guide bush 4, inside the guide bush 4. Therefore, it is desirable to form at least one groove 10A, continuous in the length direction of the holder 3, on the sliding portion 9, as the at least one concave portion 10. Alternatively, a number of the circular or oval concave portions 10 may be arranged densely and continuously in the length direction of the holder 3. As a concrete example, the circular or oval concave portions 10 may be arranged so that the array direction may become the length direction of the holder 3.

Although concrete examples of the groove 10A continuous in the length direction of the holder 3 include a spirally twisted groove, it is a linear groove that can be easily processed. Accordingly, the groove 10A of which length direction is the length direction of the holder 3 may be formed on the sliding portion 9 as the concave portion 10, as illustrated, from a viewpoint of lowering production cost of the holder 3. Thereby, lubrication oil can be always supplied from the groove 10A over the whole clearance between the guide bush 4 and the sliding portion 9. In addition, even when the sliding portion 9 is slid relative to the guide bush 4, the concave portion 10 for storing chips can be always placed between the guide bush 4 and the sliding portion 9.

In particular, the cutting depth in finishing of a hole by the reaming cutter 2 is small unlike drilling of the prepared hole H by a drill. Therefore, the deflection amount of the reamer 7 is extraordinarily small compared with the deflection amount of a drill. Accordingly, as long as an oil film of the lubrication oil is formed in the clearance between the guide bush 4 and the sliding portion 9, the friction between the guide bush 4 and the sliding portion 9 can be reduced sufficiently. For that purpose, it is not indispensable to discharge the lubrication oil from the inside of the holder 3 of the reamer 7 toward the guide bush 4, but it is enough to form the at least one groove 10A over the range of the sliding portion 9 slid relative to the guide bush 4, regardless of whether the reaming cutter 2 has been stepped as illustrated.

In other words, in case of the reamer 7 for hole finishing of which cutting depth is small unlike a drill, as long as the at least one concave portion 10, such as the at least one groove 10A, is formed on the sliding portion 9 of the holder 3, a flow path and a discharge port of lubrication oil from the inside of the holder 3 toward the guide bush 4 can be omitted regardless of whether the reaming cutter 2 has been stepped.

In particular, when the reaming cutter 2 is stepped as exemplified by FIG. 2, the deflection amount of the reaming cutter 2 can be reduced since the first cutting edges 2A formed in the tip side of the reamer 7 are guided by the prepared hole H as mentioned above. As a result, the friction between the guide bush 4 and the sliding portion 9 is decreased, and thereby the degree of lubricity required for reducing the friction also decreases, compared with a case of using a reamer which has not been stepped. Accordingly, when the reaming cutter 2 is stepped, sufficient lubricity can be attained by the lubrication oil stored in the at least one concave portion 10 even when the prepared hole H having a deeper depth is finished, and thereby a flow path and a discharge port of the lubrication oil from the inside of the holder 3 toward the guide bush 4 can be omitted.

In other words, the stepped reaming cutter 2 and securing the lubricity between the guide bush 4 and the sliding portion 9 by the lubrication oil stored in the at least one concave portion 10 allows to finish the prepared hole H having a deeper depth with high accuracy even when a flow path and a discharge port of the lubrication oil from the inside of the holder 3 toward the guide bush 4 are omitted. Moreover, the prepared hole H formed in titanium, FRP, or the like, of which cutting resistance is large can be finished with high accuracy.

Accordingly, the structure of the holder 3 can be remarkably simplified. Actually, it has been confirmed that only one linear V-groove, of which width is 0.5 mm and depth is 0.5 mm, on the sliding portion 9 of the holder 3 allowed to slide the sliding portion 9 inside the guide bush 4 in the tool axis AX direction while rotating the holder 3 without discharging lubrication oil from the inside of the holder 3.

Figure 7:
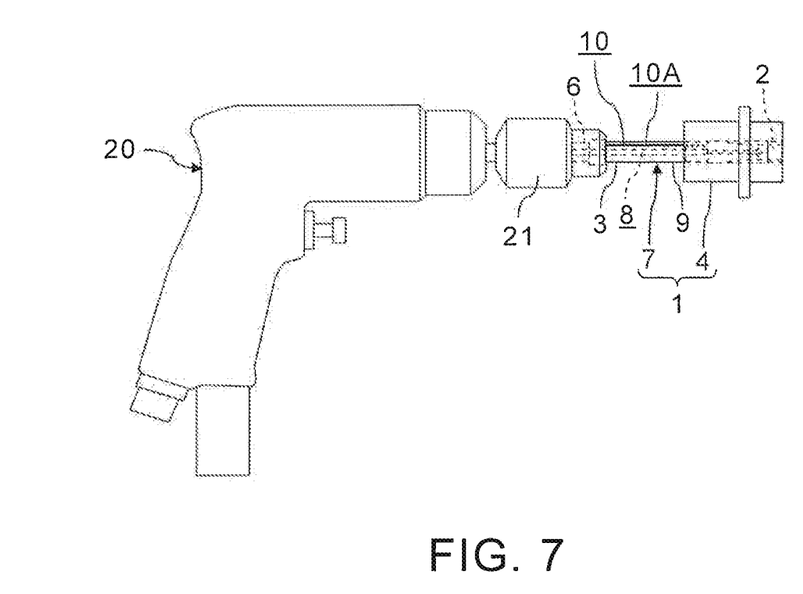
FIG. 7 shows a state where the hole finishing tool shown in FIG. 1 is held by a handheld tool rotating device.

FIG. 7 shows a state where the hole finishing tool 1 shown in FIG. 1 is held by a handheld tool rotating device 20.

As exemplified by FIG. 7, the shank 6 of the holder 3 included in the hole finishing tool 1 can be held by a holder 21 of the handheld tool rotating device 20. Then, a hole can be finished by the hole finishing tool 1. Thereby, a hole finished product can be produced.

As described above, the hole finishing tool 1 and the method of producing a hole finished product allow the reaming cutter 2 to be attached to and detached from the holder 3. In addition, the sliding portion 9, having no back taper, of the holder 3 is guided by the guide bush 4 while the lubricity between the sliding portion 9 and the guide bush 4 is secured by the lubrication oil stored in the at least one concave portion 10 formed in the sliding portion 9.
(Effects)

Therefore, according to the hole finishing tool 1 and the method of producing a hole finished product, a hole can be finished by a simple and inexpensive configuration with high precision, regardless of the rigidity of a spindle for holding the hole finishing tool 1.

Specifically, since the reaming cutter 2, which is an article of consumption, can be exchanged, only the reaming cutter 2 can be made of expensive material, such as cemented carbide, ceramic or cermet. In other words, manufacturing costs of the reamer 7 can be reduced by making the holder 3 of inexpensive material, such as high-speed steel. Alternatively, also in a case where the holder 3 is made of expensive material, such as cemented carbide, in order to improve the rigidity, when the reaming cutter 2 has been worn, the holder 3 can be successively used by exchanging only the reaming cutter 2. Accordingly, usage of expensive material, such as cemented carbide, can be reduced regardless of whether the holder 3 is made of expensive material.

In addition, even when the rigidity of a spindle is not as high as that of a machine tool, like the handheld tool rotating device 20 exemplified by FIG. 7, a hole can be finished with high accuracy by guiding the sliding portion 9 of the holder 3, having no back taper, by the guide bush 4 while lubricating the sliding portion 9 with lubrication oil.

Figure 8:
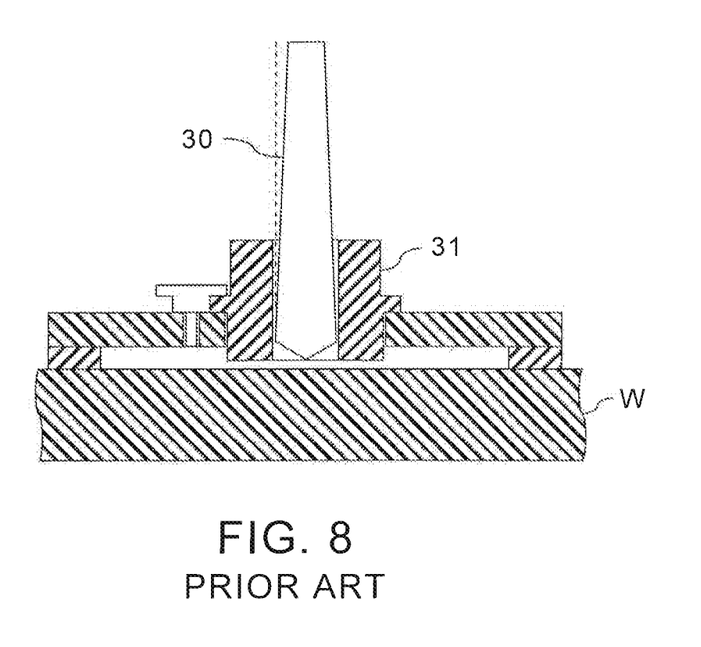
FIG. 8 explains a problem in case of drilling with a conventional straight drill, having a back taper, and a guide bush.

FIG. 8 explains a problem in case of drilling with a conventional straight drill 30, having a back taper, and a guide bush 31.

The typical drill 30 has a back taper. The back taper is formed with the aim of preventing the drill 30 from contacting with the inner wall of a hole even when the drill 30 thermally expands during drilling. The back taper is standardized and formed in the drill 30 so that the taper may become thinner toward the shank and the diameter of the drill 30 may be thinned by 0.04 mm to 0.1 mm per 100 mm in length.

However, in case of inserting the drill 30 into the guide bush 31, the more the drill 30 is fed out to the workpiece W, the larger a gap between the drill 30 and the guide bush 31 becomes. As a result, the positioning accuracy of the drill 30 deteriorates and it leads to the degradation in drilling accuracy. That is, guiding a tool having a back taper by the guide bush 31 causes degradation in the positioning accuracy.

On the contrary, in case of the hole finishing tool 1, the accuracy of positioning can be secured satisfactorily since the sliding portion 9 of the holder 3 having no back taper is guided by the guide bush 4. Furthermore, the frictional force between the holder 3 and the guide bush 4 can be reduced sufficiently since oil film of lubrication oil is formed between the sliding portion 9 and the guide bush 4. As a result, even when the sliding portion 9 of the holder 3 having no back taper thermally expands, the lubricity between the sliding portion 9 and the guide bush 4 can be secured. Thereby, the deterioration in the positioning accuracy of the reamer 7 can be prevented and the quality in finishing processing of a hole can be improved. Accordingly, even when the prepared hole H has been machined obliquely to the workpiece W, the prepared hole H can be finished into a finished hole in the right direction.

Figure 9:
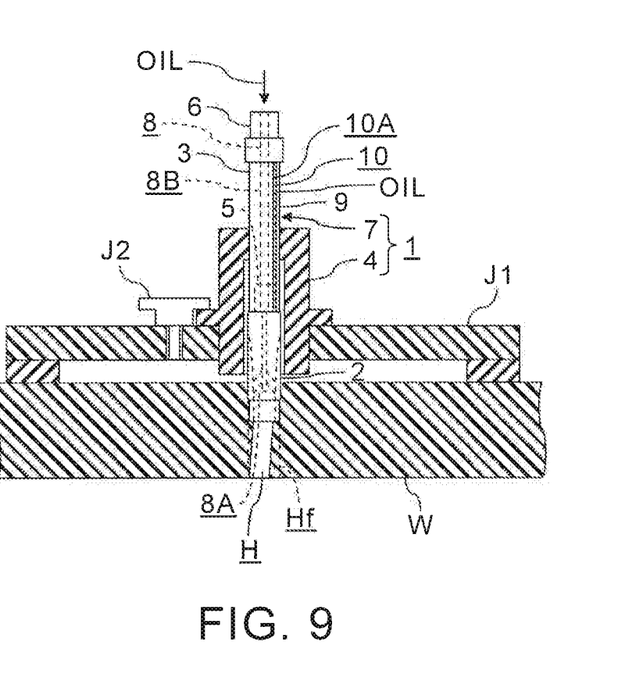
FIG. 9 shows an aspect that the prepared hole is being finished using the hole finishing tool shown in FIG. 1.

FIG. 9 shows an aspect that the prepared hole H is being finished using the hole finishing tool 1 shown in FIG. 1.

Even when the central axis of the prepared hole H is oblique to the central axis of a finished hole Hf to be machined as exemplified by FIG. 9, the central axis of the holder 3 and the central axis of the finished hole Hf can be on the same straight line since the sliding portion 9 of the holder 3 is positioned by the guide bush 4 as long as the guide bush 4 is positioned appropriately to the workpiece W. Accordingly, the hole finishing tool 1 can not only extend the diameter of the prepared hole H but also correct an error in direction of the central axis of the prepared hole H, and thereby the finished hole Hf can be machined in the intended direction.

That is, even though the prepared hole H whose central axis is not parallel to the central axis of the finished hole Hf after finishing processing has been formed, the intended finished hole Hf can be formed by finishing the prepared hole H. Therefore, even when the prepared hole H, having an error beyond a tolerance, by cutting using a drilling tool as exemplified by FIG. 8, is machined, for example, the finished hole Hf satisfying a required accuracy can be machined by finishing the prepared hole H by the hole finishing tool 1.

Furthermore, oil film of lubrication oil formed between the sliding portion 9 and the guide bush 4 in order to secure the accuracy of the finished hole Hf is formed by lubrication oil supplied from the at least one concave portion 10 of the sliding portion 9. That is, the oil film of lubrication oil is not formed by discharging cutting oil which flows inside the holder 3. Accordingly, it is unnecessary to form a branched flow path and a discharge port for discharging cutting oil in the holder 3 as well as to provide a complicated device or structure for preventing the cutting oil, flowing inside the holder 3, from scattering from a discharge port. That is, it is possible to supply lubrication oil between the sliding portion 9 and the guide bush 4 by a very simple devisal that only the at least one concave portion 10 is formed on the sliding portion 9.

(Second Implementation)

Figure 10:
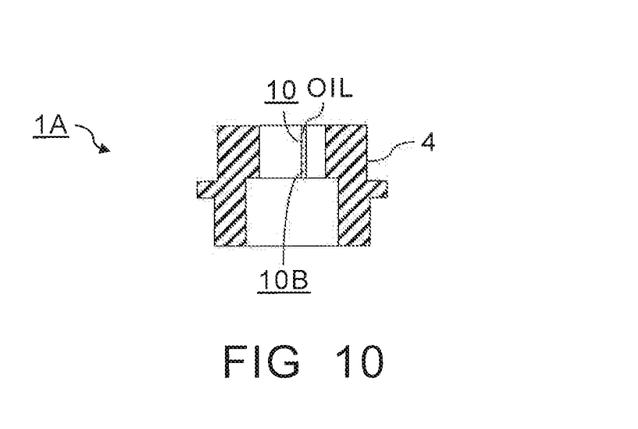
FIG. 10 is a longitudinal sectional view showing an example of a shape of a guide bush included in a hole finishing tool according to the second implementation of the present invention.

FIG. 10 is a longitudinal sectional view showing an example of a shape of a guide bush included in a hole finishing tool according to the second implementation of the present invention.

A hole finishing tool 1A in the second implementation shown in FIG. 10 is different from the hole finishing tool 1 in the first implementation in a point that at least one concave portion 10 for storing lubrication oil is formed on the inner surface of the guide bush 4. Other structure and actions of the hole finishing tool 1A in the second implementation are not substantially different from those of the hole finishing tool 1 in the first implementation. Therefore, only a longitudinal section of the guide bush 4 is illustrated, and the same sign is attached to the same or corresponding element while other explanation is omitted.

As exemplified by FIG. 10, forming the at least one concave portion 10 on the inner surface of the guide bush 4 and storing lubrication oil in the at least one concave portion 10 can also supply the lubrication oil and form oil film between the sliding portion 9 of the holder 3 and the guide bush 4. It is enough to form the at least one concave portion 10, for storing lubrication oil, on the inner surface of the guide bush 4 which has a tolerance corresponding to clearance fitting with the sliding portion 9 of the holder 3.

In case of forming a groove 10B as the concave portion 10, forming the continuous groove 10B in the length direction of the guide bush 4 allows to spread lubrication oil to all the portions. In an example shown in FIG. 10, the groove 10B whose length direction is the length direction of the guide bush 4 has been formed on the inner surface of the guide bush 4 which slidably fits to the sliding portion 9 of the holder 3.

Note that, the at least one concave portion 10 may be formed on the inner surface of the guide bush 4 instead of forming the at least one concave portion 10 on the sliding portion 9 of the holder 3, or the at least one concave portion 10 may be formed on both the sliding portion 9 of the holder 3 and the inner surface of the guide bush 4. That is, the at least one concave portion 10 for storing lubrication oil can be formed on at least one of the surface of the sliding portion 9 and the inner surface of the guide bush 4.

(Third Implementation)

Figure 11:
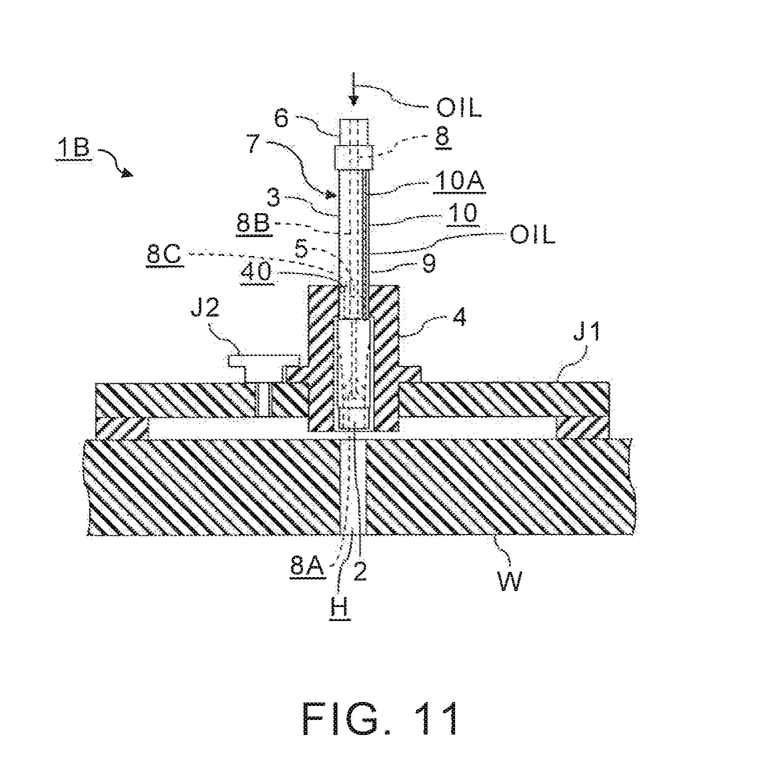
FIG. 11 shows schematic structure of a hole finishing tool according to the third implementation of the present invention.

FIG. 11 shows schematic structure of a hole finishing tool according to the third implementation of the present invention.

A hole finishing tool 1B in the third implementation shown in FIG. 11 is different from the hole finishing tool 1 in the first implementation in a point that cutting oil which flows inside the holder 3 is partially discharged toward the inner surface of the guide bush 4. Since other structure and actions of the hole finishing tool 1B in the third implementation are not substantially different from those of the hole finishing tool 1 in the first implementation, the same signs are attached to the same elements and corresponding elements while explanation thereof is omitted.

As shown in FIG. 11, the third flow path 8C or the third flow paths 8C can be branched off from the second flow path 8B in the holder 3, and at least one discharge port 40 for discharging a part of cutting oil can be formed on the lateral face of the sliding portion 9. In this case, a part of cutting oil which flows through the second flow path 8B can be used as lubrication oil for reducing the friction between the guide bush 4 and the sliding portion 9. That is, lubrication oil can also be supplied from the at least one discharge port 40 of the sliding portion 9 in addition to lubrication oil stored in the at least one concave portion 10 of the sliding portion 9.

According to the third implementation described above, the supply quantity of lubrication oil can be increased. Thereby, the lubricity between the guide bush 4 and the sliding portion 9 can be kept more certainly particularly even in case where a distance by which the sliding portion 9 is slid is made longer in order to finish a deep hole. As a result, trouble that the reamer 7 fails to move forward due to the friction between the guide bush 4 and the sliding portion 9 can be prevented more certainly.

Note that, in order to prevent cutting oil from scattering from the discharge port 40 of the holder 3 to an unnecessary area, the position of the discharge port 40 can be determined so that the discharge port 40 may be inside the guide bush 4 in the state where the reamer 7 is at a retreated position. Alternatively, when the discharge port 40 can be moved to the outside of the guide bush 4, the pressure loss of the third flow path 8C may be made large sufficiently so that cutting oil may exude from the discharge port 40. Examples of a method of enlarging the pressure loss of the third flow path 8C sufficiently include a method of forming the third flow path 8C with porous material and a method of forming the third flow path 8C as a clearance formed between a male screw and a female screw.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A hole finishing tool comprising:
   a reaming cutter having a first detaching structure in a back end side of the hole finishing tool, a first flow path for ejecting cutting oil being formed inside the reaming cutter, the first detaching structure including a first screw or coupler; and
   a holder having a second detaching structure in a tip side of the hole finishing tool, the second detaching structure being detached from and attached to the first detaching structure, a second flow path for supplying the cutting oil to the first flow path being formed inside the holder, the holder having a shank in the back end side of the hole finishing tool, the shank being held by a tool rotating device having a motor, the second detaching structure including a second screw or coupler,
   wherein the holder has a slider in the tip side of the hole finishing tool, the slider having no back taper, the slider being inserted, in use, into a positioning bush and slid inside the positioning bush in a clearance fit relationship, the slider having a concave portion which is configured for storing lubrication oil by way of surface tension adhesion of the lubricating oil received within the concave portion as to be retained within the concave portion and to maintain clearance fit lubrication during sliding and/or rotation of the slider, and wherein the slider is either free of an outer surface discharge port or has one or more discharge ports for discharging a part of the cutting oil flowing through the second flow path for reducing friction between the positioning bush and the slider, and wherein, when the one or more discharge ports are present, a most proximally positioned one of said one or more discharge ports on the holder is positioned closer to a distal end of the slider than a proximal end of the slider, wherein, at least at an interface region of the first and second detaching structures, the first and second flow paths are centrally located, with each extending along a central axis of the tool, and wherein, at least at the interface region, the concave portion of the slider is of a radial depth that is less than a length of a radius extending from the central axis of the tool to an exterior surface of the slider in which the concave portion is formed.

2. The hole finishing tool according to claim 1, wherein the slider has the one or more discharge ports that are arranged for discharging a part of the cutting oil flowing through the second flow path, the part of the cutting oil being used as the lubrication oil for reducing friction between the positioning bush and the slider.

3. The hole finishing tool according to claim 1, wherein the reaming cutter is stepped and has diameters different from each other.

4. The hole finishing tool according to claim 3, wherein the concave portion includes a groove continuous in a length direction of the holder.

5. The hole finishing tool according to claim 1, wherein the concave portion includes a groove continuous in a length direction of the holder.

6. The hole finishing tool according to claim 5, wherein the reaming cutter has a maximum diameter larger than a diameter of the slider.

7. The hole finishing tool according to claim 1, wherein the concave portion includes a groove of which length direction is a length direction of the holder.

8. The hole finishing tool according to claim 1, wherein the reaming cutter has a maximum diameter larger than a diameter of the slider.

9. A method of producing a hole finished product comprising:
producing the hole finished product using the hole finishing tool according to claim 1.

10. The method according to claim 9, wherein the tool rotating device is handheld, and the hole finishing tool is hold by the handheld tool rotating device.

11. The method according to claim 9, wherein a finished hole is formed by finishing a prepared hole of which central axis is not parallel to a central axis of the finished hole.

12. The hole finishing tool according to claim 1, wherein the slider is free of an outer surface discharge port.

13. The hole finishing tool according to claim 1, wherein the reaming cutter has multiple cutting edges separated by multiple flutes, and wherein the concave portion is the only concave portion extending along the exterior of the slider.

14. A hole finishing tool comprising:
a reaming cutter having a first detaching structure in a back end side of the hole finishing tool, a first flow path for ejecting cutting oil being formed inside the reaming cutter, the first detaching structure including a first screw or coupler;

a holder being more proximally positioned along an axis of elongation of the hole finishing tool than the reamer cutter, said holder having a second detaching structure in a tip side of the hole finishing tool, the second detaching structure being detached from and attached to the first detaching structure, a second flow path for supplying the cutting oil to the first flow path being formed inside the holder, the holder having a shank in the back end or proximal side of the hole finishing tool, the shank being held by a tool rotating device having a motor, the holder having a slider in the tip side of the hole finishing tool, the slider having no back taper, the second detaching structure including a second screw or coupler; and a positioning bush for inserting and sliding the slider, the positioning bush and slider being in a clearance fit relationship, wherein at least one of an outer surface of the slider and an inner surface of the positioning bush has a concave portion which is configured for storing lubrication oil by way of surface tension adhesion of the lubricating oil received within the concave portion as to be retained within the concave portion and to maintain clearance fit lubrication during sliding and/or rotation of the slider, and wherein the slider is either free of an outer surface discharge port or has one or more discharge ports for discharging a part of the cutting oil flowing through the second flow path for reducing friction between the positioning bush and the slider, and wherein, when the one or more discharge ports are present, a most proximally positioned one of said one or more discharge ports on the slider is retained within the bush in a most retreated position of the slider within the bush, wherein, at least at an interface region of the first and second detaching structures, the first and second flow paths are centrally located, with each extending along a central axis of the tool, and wherein, at least at the interface region, the concave portion of the slider is of a radial depth that is less than a length of a radius extending from the central axis of the tool to an exterior surface of the slider in which the concave portion is formed.

15. The hole finishing tool according to claim 14, wherein the slider has the one or more discharge ports that are arranged for discharging a part of the cutting oil flowing through the second flow path, the part of the cutting oil being used as the lubrication oil for reducing friction between the positioning bush and the slider.

16. The hole finishing tool according to claim 14, wherein the reaming cutter is stepped and has diameters different from each other.

17. The hole finishing tool according to claim 14, wherein the concave portion includes a groove continuous in a length direction of the holder.

18. The hole finishing tool according to claim 14, wherein the reaming cutter has a maximum diameter larger than a diameter of the slider.

19. A method of producing a hole finished product comprising:
producing the hole finished product using the hole finishing tool according to claim 14.

20. The hole finishing tool according to claim 14, wherein the slider is free of an outer surface discharge port.

21. The hole finishing tool according to claim 14, wherein the reaming cutter has multiple cutting edges separated by multiple flutes, and wherein the concave portion is the only concave portion extending along the exterior of the slider.

22. A hole finishing tool comprising:
- a reaming cutter having a first detaching structure in a back end side of the hole finishing tool, a first flow path for ejecting cutting oil being formed inside the reaming cutter, the first detaching structure including a first screw threaded region; and
- a holder having a second detaching structure in a tip side of the hole finishing tool, the second detaching structure being detached from and attached to the first detaching structure, a second flow path for supplying the cutting oil to the first flow path being formed inside the holder, the holder having a shank in the back end side of the hole finishing tool, the shank being held by a tool rotating device having a motor, the second detaching structure including a second screw threaded region; and
- a positioning bush,
  - wherein the holder has a slider in the tip side of the hole finishing tool, the slider having no back taper, the slider being inserted into the positioning bush and slid inside the positioning bush in a clearance fit relationship, the slider having a concave portion which is configured for storing lubrication oil by way of surface tension adhesion of the lubricating oil received within the concave portion as to be retained within the concave portion and to maintain clearance fit lubrication during sliding and/or rotation of the slider, and wherein the first and second screw threaded regions include a female screw threaded section defining a reception recess, and a male screw threaded member featuring a first step down region extending axially away from a supporting one of said reamer cutter and holder and a second step down region extending axially away from the first step down region to a free end, and with the second step down region having a diameter smaller than the first step down region, and with the male screw threaded member being threadably secured within the reception recess such that the first step down region is positioned within the bushing upon full retraction of the reamer cutter into the bushing,
  - wherein, at least at a threading interface region of the first and second detaching structures, the first and second flow paths are centrally located, with each extending along a central axis of the tool, and
  - wherein, at least at the threading interface region, the concave portion of the slider is of a radial depth that is less than a length of a radius extending from the central axis of the tool to an exterior surface of the slider in which the concave portion is formed.

23. The hole finishing tool according to claim 22, wherein the reaming cutter has multiple cutting edges separated by multiple flutes, and wherein the concave portion is the only concave portion extending along the exterior of the slider.

* * * * *